US006315132B1

(12) United States Patent
Hartel et al.

(10) Patent No.: US 6,315,132 B1
(45) Date of Patent: Nov. 13, 2001

(54) RACK FOR A SWITCHGEAR CABINET

(75) Inventors: Marc Hartel, Reiskirchen; Walter Nicolai, Buseck, both of (DE)

(73) Assignee: Rittal-Werk Rudolf Loh GmbH & Co. KG, Herborn (DE)

(*) Notice: Subject to any disclaimer, the term of this patent is extended or adjusted under 35 U.S.C. 154(b) by 0 days.

(21) Appl. No.: 09/612,783

(22) Filed: Jul. 10, 2000

(30) Foreign Application Priority Data

Jul. 10, 1999 (DE) .............................................. 199 32 304

(51) Int. Cl.[7] .................................................... A47F 5/00
(52) U.S. Cl. ........................ 211/26; 211/189; 312/265.1; 312/265.4; 361/829
(58) Field of Search ............................. 211/26, 189, 191; 361/829; 312/265.1, 265.2, 265.3, 265.4, 265.5, 265.6

(56) References Cited

U.S. PATENT DOCUMENTS

| 5,498,073 | * | 3/1996 | Charbonneau et al. | ...... 312/265.4 X |
| 5,997,117 | * | 12/1999 | Krietzman | ......................... 312/265.4 |
| 6,123,400 | * | 9/2000 | Nicolai et al. | .......................... 211/26 |
| 6,149,255 | * | 11/2000 | Benner et al. | ...................... 312/265.4 |
| 6,164,737 | * | 12/2000 | Benner et al. | ................. 312/265.5 X |
| 6,170,673 | * | 1/2001 | Nicolai | ..................................... 211/26 |
| 6,174,034 | * | 1/2001 | Benner et al. | ...................... 211/26 X |
| 6,231,142 | * | 5/2001 | Pochet | ................................ 211/189 X |

FOREIGN PATENT DOCUMENTS 196 47 791    11/1996   (DE) .

* cited by examiner

Primary Examiner—Robert W. Gibson, Jr.
(74) Attorney, Agent, or Firm—Pauley Petersen Kinne & Fejer

(57) ABSTRACT

A rack for a switchgear cabinet with vertical and horizontal profiled frame sections, wherein two of the horizontal profiled frame sections are connected by a corner connector to at least one rack corner area. Two horizontal profiled frame sections are connected with each other, forming a corner angle and having a receptacle, which is open toward the exterior of the rack. The receptacle is symmetrical with respect to a bisecting line dividing an angle of the corner angle. A corner connector is fixed in place in the corner connector. The vertical profiled frame section can be fixed in place in the receptacle using a fastening shoulder of the corner connector. The vertical profiled frame section can selectively be designed symmetrical or asymmetrical with respect to the bisecting line of the angle of the receptacle. The corner connector has a compensating element for fixing the asymmetrical profiled frame section in place. The asymmetrical vertical profiled frame section can be inserted into the receptacle in the direction of the bisecting line of the angle and can be attached to the fastening shoulder. In the assembled state, a profiled side of the asymmetrical vertical profiled frame section rests against the front face of the horizontal profiled frame section extending in the direction of the rack depth, and is designed as a depth strut and at least partially covers the front face. A shoulder of the asymmetrical profiled frame section is attached flat on a contact surface of the compensating element, wherein the contact surface extends transversely with respect to the center longitudinal axis of the horizontal profiled frame section.

18 Claims, 4 Drawing Sheets

RACK FOR A SWITCHGEAR CABINET

BACKGROUND OF THE INVENTION

1. Field of the Invention

This invention relates to a rack for a switchgear cabinet with vertical and horizontal profiled frame sections, wherein two of the horizontal profiled frame sections are connected by a corner connector to at least one rack corner area, and wherein the two horizontal profiled frame sections are connected with each other, forming a corner angle and having a receptacle, which is open toward the exterior of the rack, wherein the receptacle is embodied symmetrical with respect to a bisecting line dividing the angle of the corner angle. A corner connector is fixed in place, and the vertical profiled frame section can be fixed in place in the receptacle using a fastening shoulder of the corner connector, wherein the vertical profiled frame section can selectively be designed symmetrical or asymmetrical with respect to the bisecting line of the angle of the receptacle, and wherein the corner connector has a compensating element for fixing the asymmetrical profiled frame section in place.

2. Description of Related Art

A rack is known from German Patent Reference DE 196 47 791 A1. This document discloses a rack, wherein the horizontal depth and latitudinal struts have a beveled section. Respectively, two depth and latitudinal struts are placed against each other in this beveled section for forming a bottom and a top frame. Receptacles are created in the corner areas of the bottom/top frames, into which corner connectors are welded. The corner connectors project past the bottom/top frame with fastening shoulders. The vertical profiled frame sections can be installed on the fastening shoulders. Depending on the intended use, symmetrical or asymmetrical vertical profiled frame sections are selectively installed as vertical frame profiles. Thus, different clearances can be achieved between two adjoining vertical profiled frame sections. It is difficult to exchange symmetrical vertical profiled frame sections of an existing rack for asymmetrical ones. To do this it is necessary to dismantle the entire rack. Only then is it possible to push the asymmetrical vertical frame sections, which are designed as profiled hollow chambers, onto the fastening shoulder of the corner connector with their hollow chambers.

As German Patent Reference DE 196 47 791 shows, it is not possible to insert the asymmetrical vertical frame profile into the receptacle of the bottom/top frame. It rests instead with a front end on longitudinal ends of the depth and latitudinal struts. However, an open area is thus created, which must be elaborately sealed.

SUMMARY OF THE INVENTION

It is one object of this invention to further develop a profiled frame section of the type mentioned above so that a simple and solid installation of the asymmetrical vertical profiled frame section is possible.

This object is attained with an asymmetrical vertical profiled frame section that can be inserted into the receptacle in the direction of the bisecting line of the angle and can be attached to the fastening shoulder. In an assembled state a profiled side of the asymmetrical vertical profiled frame section rests against the front face of the horizontal profiled frame section extending in the direction of the rack depth, and is designed as a depth strut and covers this front face, at least partially. A shoulder of the asymmetrical profiled frame section is attached flat on a contact surface of the compensating element, wherein the contact surface extends transversely with respect to the center longitudinal axis of the horizontal profiled frame section, which is designed as a latitudinal strut and extends in the direction of the width of the rack.

The shoulder of the asymmetrical vertical profiled frame section can be inserted into the receptacle from the outside of the profiled frame section, the same as the symmetrical one, and can then be fixed in place on the fastening shoulder. This makes it possible for a simple change of various types of vertical profiled frame sections, since it is no longer necessary to completely dismantle the rack. The asymmetrical vertical profiled frame section can be solidly fixed in place in the receptacle, since it is in flat contact with the front end of the depth strut, as well as on the contact face of the compensating element. Because the asymmetric vertical profiled frame section can be placed snugly into the receptacle, the receptacle is filled, and elaborate sealing measures are then not required.

To reduce the cost for parts and handling, the compensating element can be formed in one piece on the corner connector for the asymmetric vertical profiled frame section. It is possible to design a particularly solid rack if the depth strut is connected with, preferably welded to, the latitudinal strut by the corner connector.

In one preferred embodiment of this invention, the corner connector has a base element, which is inserted by fastening shoulders from the front into the hollow chambers enclosed by the depth strut and the latitudinal strut. The corner connector can be aligned with respect to the depth and latitudinal struts by the fastening shoulders. Also, the fastening shoulders can be used for improving the sealing of the corner connection.

To form a transporting possibility, by which the switchgear cabinet can be handled, the depth and latitudinal struts can have partial recesses in the area of the front ends which, in the assembled state, are combined into a common opening which is arranged flush in connection with a receptacle of the corner connector that is accessible from the exterior of the rack through the opening. The receptacle thus be a threaded receiver, for example, into which a transport eye is screwed.

In order to be able to align the asymmetric vertical profiled frame section exactly with respect to the depth strut and the latitudinal strut, in one embodiment of this invention the corner connector has two support surfaces facing the exterior of the rack, which are arranged at an angle relative to each other and on which the vertical profiled frame section is aligned by counter-faces. In this case, the fastening shoulder has a fastening element having an overhanging protrusion that extends behind an undercut of the vertical profiled frame section.

Depending on installation conditions in the interior of the switchgear cabinet, or respectively space conditions in the surroundings, the vertical profiled frame section is screwed together with the corner connector from direction of the exterior of the rack and/or from the direction on the interior of the rack. The selective fixation method from the inside or the outside provides the assembler with easier assembly options, in case of restricted spatial conditions.

Thus, the fastening of the vertical asymmetrical profiled frame section from the inside can be such that the vertical profiled element has a further profiled side bent off at right angles from the profiled side resting against the depth strut and which faces the interior of the rack. The two profiled sides have rows of fastening receivers. The fastening shoulder of the corner connector is screwed together with the inner profiled side from the direction of the interior of the rack. For assembly on the exterior, the vertical profiled frame section can have a connecting section extending vertically with respect to the line bisecting the angle of the receptacle, which rests with its inner side against the corner connector, and which is screwed together with the corner connector from the direction of the exterior of the rack.

BRIEF DESCRIPTION OF THE DRAWINGS

This invention will be described in greater detail in what follows by illustration of preferred embodiments shown in the drawings wherein.

DESCRIPTION OF PREFERRED EMBODIMENTS

Figure 1:
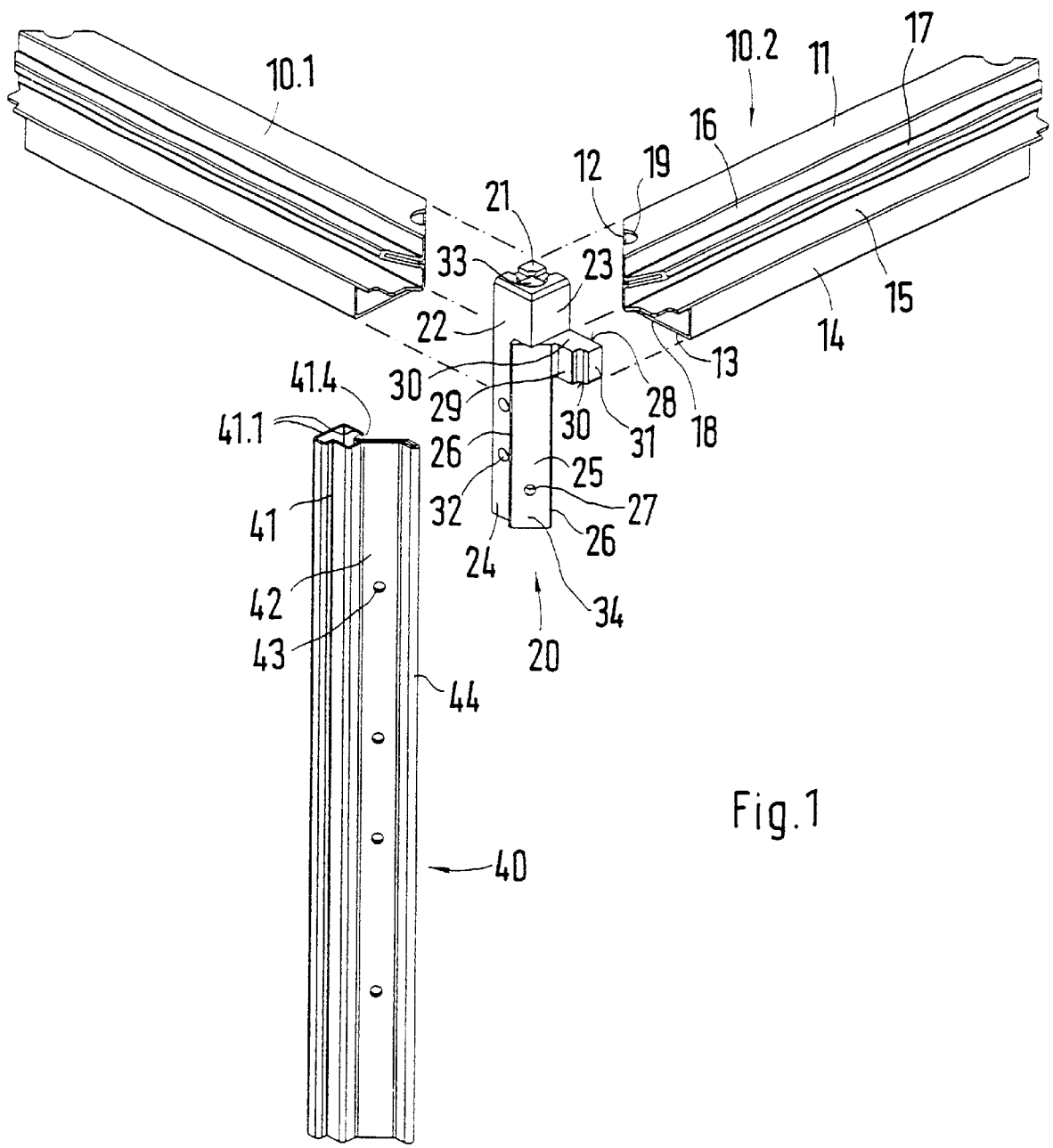
FIG. 1 shows a corner area of a rack for a switchgear cabinet, in a perspective exploded and partial view.
Figure 4:
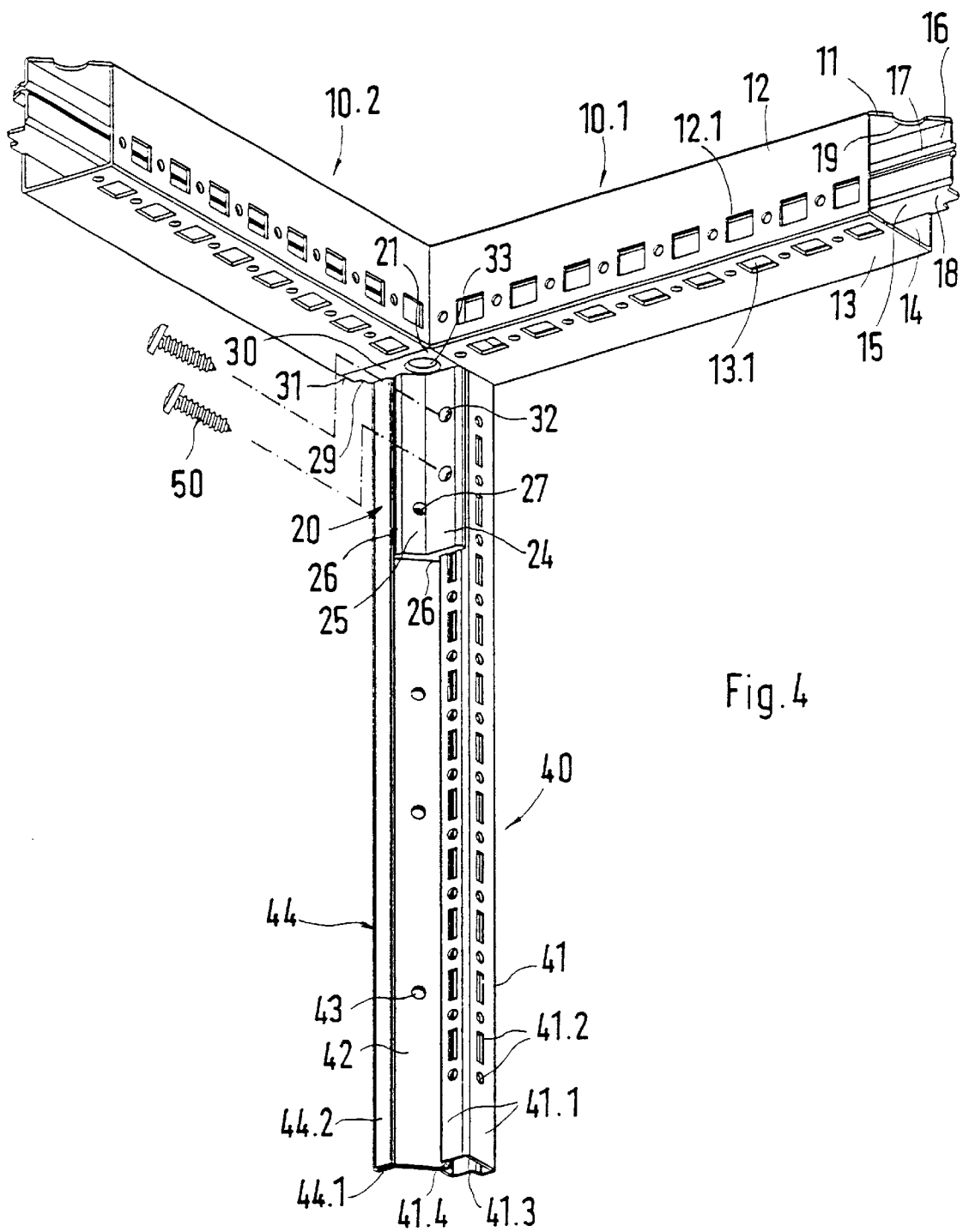
FIG. 4 shows the corner connector in accordance with FIGS. 1 to 3, in a plan view from a direction of an interior of the rack.

A rack of a switchgear cabinet is shown in FIG. 1. The rack is assembled from horizontal and vertical profiled frame sections. Here, the horizontal profiled frame sections comprise depth struts 10.1 and latitudinal struts 10.2. The depth and latitudinal struts 10.1 and 10.2 are constructed with the same cross section. Respectively, two depth and two latitudinal struts 10.1 and 10.2 can be assembled into a bottom frame and a top frame. A partial representation of a top frame is shown in FIG. 1. The horizontal profiled frame sections, the depth struts 10.1 and latitudinal struts 10.2, have an upper cover section 11 which makes a right-angled transition into a profiled side 12 in its area facing the interior of the rack. A profiled side 13 is bent off the profiled side 12 and also faces the interior of the rack. FIG. 4 shows the two profiled sides 12 and 13 with rows of fastening receivers 12.1 and 13.1. FIG. 1 shows that the profiled side 13 transitions into an outer sealing strip 14. The sealing strip 14 is bent at right angles from the profiled side 13. A bevel 15 joins the sealing strip 14 at right angles. The bevel 15 extends parallel with the profiled side 13. The cover section 11 and the bevel 15 are connected by a vertical wall 16. The vertical wall 16 forms a projection 17, which protrudes from the wall 16 in the form of a double-folded flap and is arranged at an angle with respect to the wall 16. The projection 17, which extends over the entire horizontal length of the horizontal profiled frame section, is used as a rain gutter. Water running off the top of the switchgear cabinet can be diverted by means of the rain gutter.

At their ends, the depth and latitudinal struts 10.1 and 10.2 have beveled sections. The depth and latitudinal struts 10.1 and 10.2 can be placed against each other with the beveled sections for forming the corner area. Before the horizontal profiled frame sections are joined, a corner connector 20 is inserted into the hollow chambers of the depth and latitudinal struts 10.1 and 10.2. The corner connector 20 has a base element 21 for this purpose. The base element 21 has fastening shoulders, which can be partially pushed into the hollow chambers. In the inserted state, the base element 21 rests with contact faces 22, 23 against inner walls of the depth and latitudinal struts 10.1 and 10.2. In this embodiment, the contacts faces 22, 23 rest against the wall 16 of the depth and latitudinal struts 10.1 and 10.2. The unit, which is formed from the depth and latitudinal struts 10.1 and 10.2 and the corner connector 20, can be welded or screwed together for final fixation. As FIG. 1 shows, the depth and latitudinal struts 10.1 and 10.2 have partial recesses 19 in an area of their front ends. These two partial recesses 19 are combined into a common recess. This common recess is aligned with a receptacle 33, which is cut into the base element 21 of the corner connector 20 as a threaded receiver.

The corner connector 20 has a compensating element 30 following the base element 21. The compensating element 30 rests with a flat end face on the edge formed by the two profiled sides 12 and 13 and the sealing strip 14. The sealing strip 14 makes a flush transition into a surface of the compensating element 30, which is designed as a sealing strip extension 31, as shown in FIG. 1.

Figure 2:
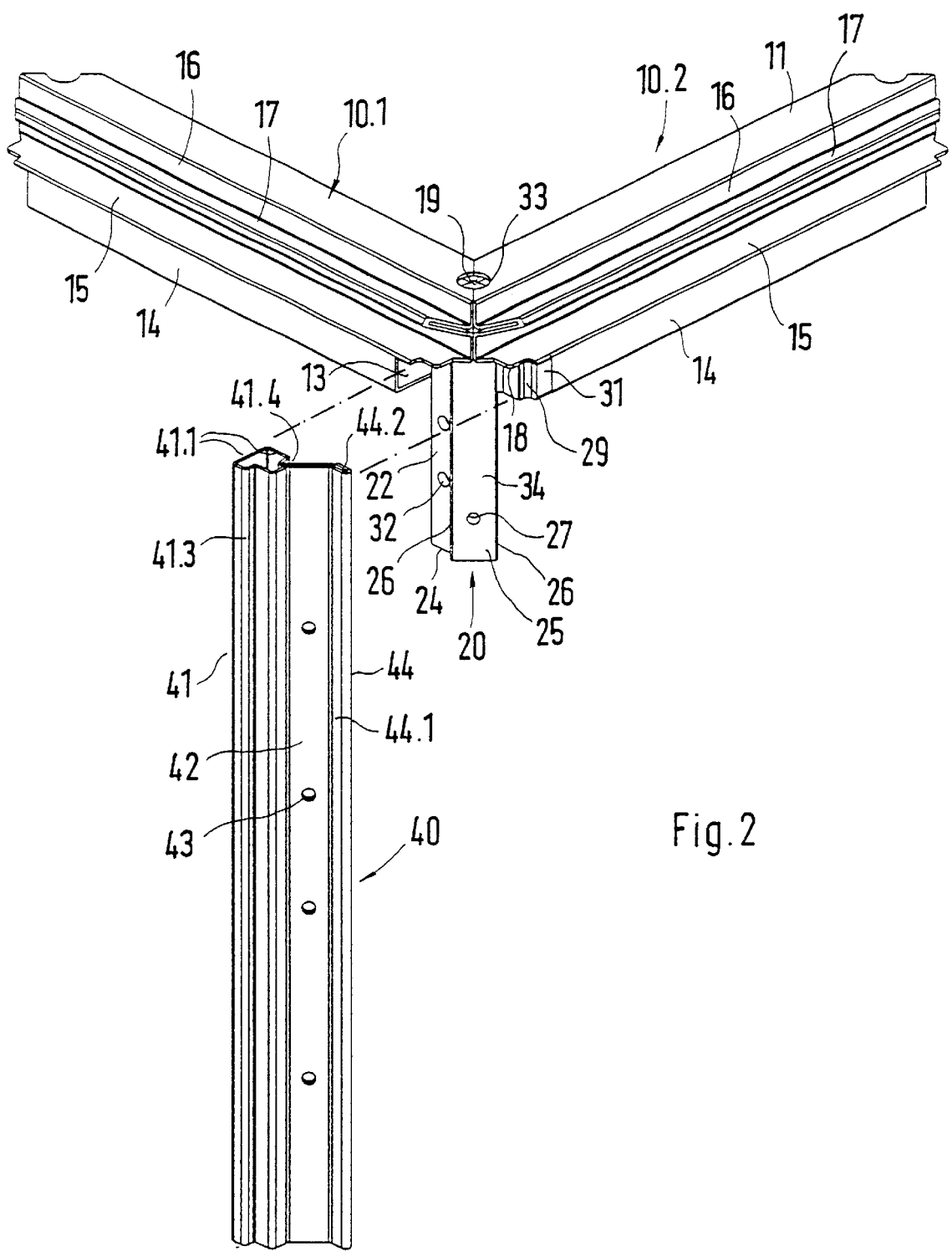
FIG. 2 shows a perspective view of the corner area in accordance with FIG. 1, but in a partially assembled state.

As FIG. 2 shows, the compensating element 30 has a contact surface 29 which is arranged at a parallel distance from the end face 28. The contact surface 29 transitions into the sealing strip extension 31 via an exterior profile. FIG. 2 shows the exterior profile matched to a notch 18 of the latitudinal strut 10.2. The notch 18 is cut out of the bevel 15 of the latitudinal strut 10.2. The depth strut 10.1 also has such a notch 18.

FIG. 1 shows a fastening shoulder 24 connected to the base element 21 of the corner connector 20. The fastening shoulder 24 is connected in one piece with the compensating element 30 and projects beyond the compensating element. The fastening shoulder 24 has a fastening element 25 with a vertical support face 34. The support face 34 extends at an angle with respect to a further support face of the fastening shoulder 24 resulting from the extension of the contact face 22 of the base element 21. The extended contact face 22 has two fastening receivers 32. A fastening receiver 27 is cut into the support face 24. On its edge facing the contact face 22, the support face 34 of the fastening element 25 has a protrusion 26. The protrusion 26, which is wedge-shaped in cross section, projects beyond the contact face 22.

As FIG. 2 shows, the fastening shoulder 24 is used for connecting a vertical profiled frame section 40. The profiled frame section 40 can be inserted into the receptacle formed by the depth and latitudinal struts 10.1 and 10.2. Initially, the receptacle is bordered by the front ends of the depth and latitudinal struts 10.1 and 10.2, wherein a corner angle of 90° is enclosed between the two front ends. The receptacle is designed symmetrically with respect to the line bisecting the angle of this corner angle.

The vertical profiled frame section 40 is designed to be asymmetrical with respect to the bisecting line of the angle. It has a flat connecting section 42, on whose two vertical longitudinal edges shoulders 41 and 44 are arranged. The shoulder 41 has two profiled sides 41.1 facing the interior of the rack. As shown in FIG. 4, these two profiled sides 41.1 have rows of fastening receivers 41.2. The profiled side 41.1 facing the connecting section 42 transitions into the connecting section 42 via a dovetail-shaped undercut 41.4. In the area of the exterior of the vertical profiled frame section 40, the second profiled side 41.1 transitions into the connecting section 42 via an outer profile 41.3.

The shoulder 44 is formed by a bevel 44.1, which is bent at an angle from the connecting section 42. A fold 44.2 is bent at an angle of 180° from the bevel 44.1. The fold 44.2 rests against the inside of the bevel 44.1.

To complete the corner connection, the vertical profiled frame section 40 is inserted in the area of its front end into the receptacle of the corner connection. As indicated by the phantom lines in FIG. 2, the insertion movement can occur from the direction of the exterior of the rack. With its profiled side 41.1 extending parallel with respect to the sealing strip 14 of the depth strut 10.1, the vertical profiled frame section rests against the contact face 22 of the fastening shoulder 24. The connecting section 42 rests against the support surface 34 of the fastening element 25. In the assembled state, the protrusion 26 of the fastening element 25 engages the dovetail-shaped undercut 41.4 of the vertical profiled frame section 40.

Figure 3:
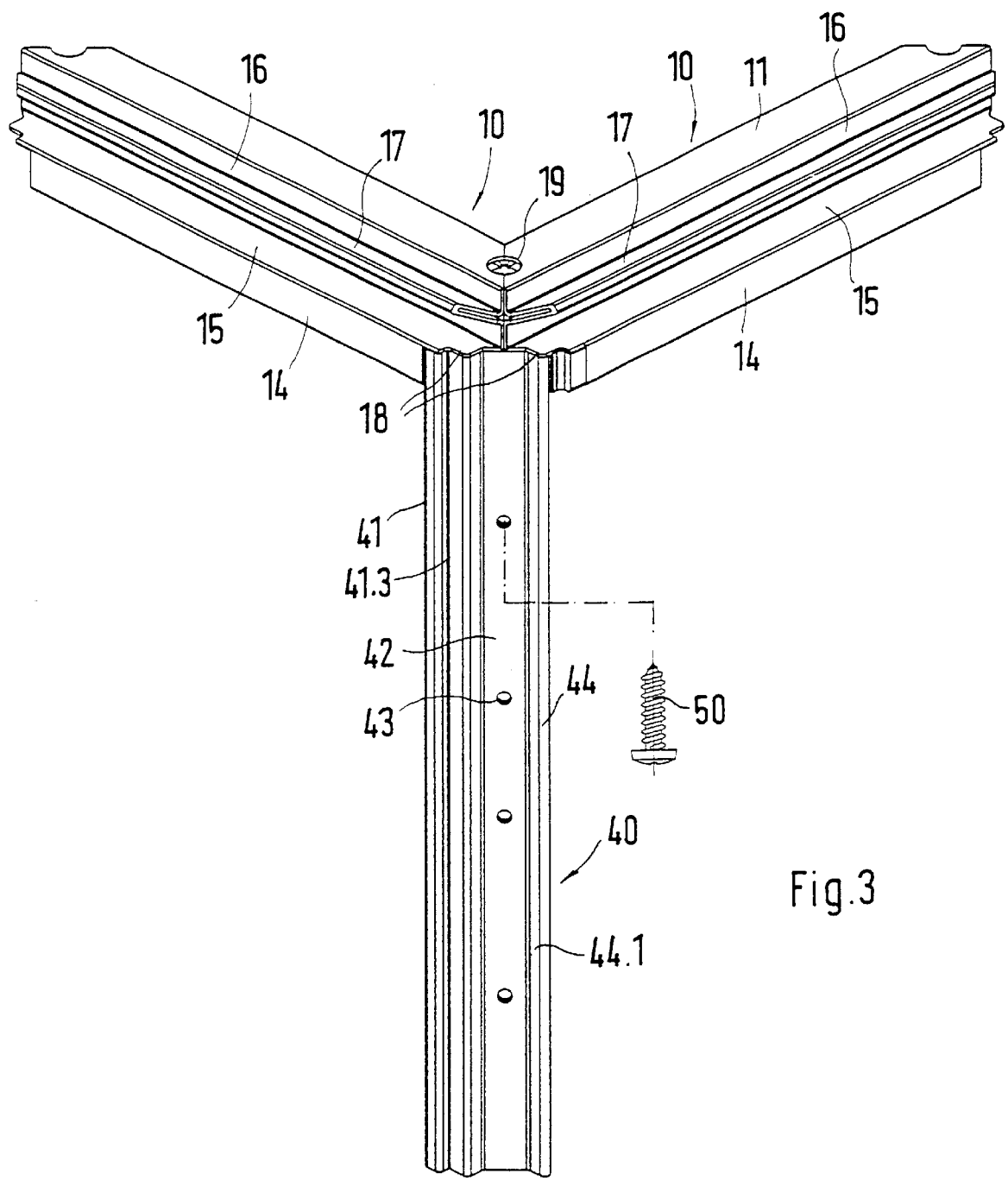
FIG. 3 shows a perspective view of the corner area in accordance with FIGS. 1 and 2, but in an assembled state.

As FIG. 3 shows, the vertical profiled frame section makes a flush transition into the notches 18 of the depth and latitudinal struts 10.1 and 10.2 in the outer area formed by the outer profile 41.3, the connecting section 42 and the bevel 44.1. Fastening of the vertical profiled frame section 40 on the corner connector 20 can occur from the outside and/or the inside of the rack. FIG. 3 shows the fastening of the vertical profiled frame section 40 from the direction of the outside of the rack. As shown, a fastening screw 50 can be passed through a fastening receiver 27 of the fastening receiver 43 of the connecting section 42 and screwed into the fastening receiver 27 of the fastening element 25 of the corner connector 20, or if desired, can be secured by means of a nut in the area behind the fastening element.

The process for fastening the vertical profiled frame section 40 on the inside is shown in FIG. 4. For this purpose, two fastening screws 50 are inserted into the fastening receivers 32 of the fastening shoulder 24 and screwed into the corresponding fastening receivers 41.2 of the profiled side 41.1 of the vertical profiled frame section 40.

As shown in FIGS. 1 and 4, the asymmetrical vertical profiled frame section 40 can be connected in a simple manner to an existing rack, or removed from it. It is only necessary to release the connections, such as the fastening screws 50. Then the vertical profiled frame section can be pulled out of the receptacles at the bottom and top by its front ends.

What is claimed is:

1. In a rack for a switchgear cabinet having vertical and horizontal profiled frame sections, wherein two of the horizontal profiled frame sections are connected by a corner connector to at least one rack corner area, the two horizontal profiled frame sections are connected with each other to form a corner angle and have a receptacle which is open toward an exterior of a rack, wherein the receptacle is symmetrical with respect to a bisecting line dividing an angle of the corner angle, a corner connector is fixed in place, the vertical profiled frame section can be fixed in place in the receptacle using a fastening shoulder of the corner connector, the vertical profiled frame section can selectively be designed symmetrical or asymmetrical with respect to the bisecting line of the angle of the receptacle, and the corner connector has a compensating element for fixing the asymmetrical profiled frame section in place, the improvement comprising:

the asymmetrical vertical profiled frame section (40) insertable into the receptacle in a first direction of the bisecting line of the angle and attachable to the fastening shoulder (24);

in an assembled state a profiled side (41.1) of the asymmetrical vertical profiled frame section (40) resting against a front face of the horizontal profiled frame section extending in a second direction of a rack depth and designed as a depth strut (10.1) at least partially covering the front face; and a shoulder (44) of the asymmetrical profiled frame section (40) attached flat on a contact surface (29) of a compensating element (30) wherein the contact surface (29) extends transversely with respect to a center longitudinal axis of the horizontal profiled frame section which is designed as a latitudinal strut (10.2) extending in a third direction of a width of the rack.

2. In the rack in accordance with claim 1, wherein the compensating element (30) is formed in one piece on the corner connector (20) for the asymmetric vertical profiled frame section (40).

3. In the rack in accordance with claim 2, wherein the depth strut (10.1) is connected with the latitudinal strut by the corner connector (20).

4. In the rack in accordance with claim 3, wherein the corner connector (20) has a base element (21) which is inserted by the fastening shoulder (24) from a front into a hollow chamber enclosed by the depth strut (10.1) and the latitudinal strut (10.2).

5. In the rack in accordance with claim 4, wherein the depth struts (10.1) and the latitudinal struts (10.2) have partial recesses (19) in an area of front ends which in the assembled state form a common opening, and the opening is flush with a receptacle of the corner connector (20) which is accessible from the exterior of the rack through the opening.

6. In the rack in accordance with claim 5, wherein the corner connector (20) has two support surfaces (34) facing the exterior of the rack which are arranged at an angle relative to each other and on which the vertical profiled frame section (40) is aligned by a plurality of counter-faces.

7. In the rack in accordance with claim 6, wherein the fastening shoulder (24) has a fastening element (25) with an overhanging protrusion (26) that extends behind an undercut (41.4) of the vertical profiled frame section (40).

8. In the rack in accordance with claim 7, wherein the vertical profiled frame section (40) is screwed together with the corner connector (20) from at least one of the exterior of the rack and the interior of the rack.

9. In the rack in accordance with claim 8, wherein the vertical profiled frame section (40) has a profiled side (41.1) bent at a right angle and resting against the depth strut (10.1) and facing the interior of the rack, the profiled side (41.1) has a row of fastening receivers (41.2), and the fastening shoulder (24) of the corner connector (20) is screwed together with the inner profiled side (41.1) from the interior of the rack.

10. In the rack in accordance with claim 9, wherein the vertical profiled frame section (40) has a connecting section (42) extending vertically with respect to the bisecting line of the receptacle which rests with an inner side against the corner connector (20) and which is screwed together with the corner connector (20) from the exterior of the rack.

11. In the rack in accordance with claim 1, wherein the depth strut (10.1) is connected with the latitudinal strut by the corner connector (20).

12. In the rack in accordance with claim 1, wherein the corner connector (20) has a base element (21) which is inserted by the fastening shoulder (24) from a front into a hollow chamber enclosed by the depth strut (10.1) and the latitudinal strut (10.2).

13. In the rack in accordance with claim 1, wherein the depth struts (10.1) and the latitudinal struts (10.2) have partial recesses (19) in an area of front ends which in the assembled state form a common opening, and the opening is flush with a receptacle of the corner connector (20) which is accessible from the exterior of the rack through the opening.

14. In the rack in accordance with claim 1, wherein the corner connector (20) has two support surfaces (34) facing the exterior of the rack which are arranged at an angle relative to each other and on which the vertical profiled frame section (40) is aligned by a plurality of counter-faces.

15. In the rack in accordance with claim 1, wherein the fastening shoulder (24) has a fastening element (25) with an overhanging protrusion (26) that extends behind an undercut (41.4) of the vertical profiled frame section (40).

16. In the rack in accordance with claim 1, wherein the vertical profiled frame section (40) is screwed together with the corner connector (20) from at least one of the exterior of the rack and the interior of the rack.

17. In the rack in accordance with claim 16, wherein the vertical profiled frame section (40) has a profiled side (41.1) bent at a right angle and resting against the depth strut (10.1) and facing the interior of the rack, the profiled side (41.1) has a row of fastening receivers (41.2), and the fastening shoulder (24) of the corner connector (20) is screwed together with the inner profiled side (41.1) from the interior of the rack.

18. In the rack in accordance with claim 8, wherein the vertical profiled frame section (40) has a connecting section (42) extending vertically with respect to the bisecting line of the receptacle which rests with an inner side against the corner connector (20) and which is screwed together with the corner connector (20) from the exterior of the rack.

* * * * *